United States Patent [19]

Hauptmann

[11] 4,361,840
[45] Nov. 30, 1982

[54] CIRCUIT ARRANGEMENT FOR A RADAR FOR AUTOMATIC RECOGNITION OF MOVING TARGETS

[75] Inventor: Rudolf Hauptmann, Munich, Fed. Rep. of Germany

[73] Assignee: Siemens Aktiengesellschaft, Berlin & Munich, Fed. Rep. of Germany

[21] Appl. No.: 137,279

[22] Filed: Apr. 4, 1980

[30] Foreign Application Priority Data

May 30, 1979 [DE] Fed. Rep. of Germany ....... 2921979

[51] Int. Cl.³ ..................... G01S 13/52; G01S 13/70
[52] U.S. Cl. .................. 343/7.7; 343/5 CF; 343/7.3
[58] Field of Search ............ 343/5 CF, 7.7, 7.3

[56] References Cited

U.S. PATENT DOCUMENTS

| | | | |
|---|---|---|---|
| 3,995,270 | 11/1976 | Perry et al. | 343/5 CF X |
| 4,089,001 | 5/1978 | Donahue | 343/7.7 |
| 4,206,463 | 6/1980 | Glasgow | 343/7.7 X |
| 4,213,127 | 7/1980 | Cole | 343/5 CF |

OTHER PUBLICATIONS

"Suppression of Weibull-Distributed Clutters Using a Cell-Averaging LOG/CFAR Receiver" by Matsuo Sekine et al., IEEE Transactions on Aerospace and Electronic Systems, vol. AES-14, No. 5, Sep. 1978, pp. 823-826.

"Charge-Transfer Analog Memories for Radar and ECM Systems" by Walter J. Butler et al., IEEE Transactions on Electron Devices, vol. ED-23, No. 2, Feb. 1976, pp. 161-168.

"Automatic Identification of Flight Targets by Means of Digital Radar Homing Extraction" by Heinz Ebert, in Wissenschaftliche Berichte, AEG-Telefunken 42 (1969) 1, pp. 39-48.

"Radar Handbook", M. I. Skolnik, McGraw Hill Book Co., 1970, pp. 15-18.

*Primary Examiner*—Malcolm F. Hubler
*Attorney, Agent, or Firm*—Hill, Van Santen, Steadman, Chiara & Simpson

[57] ABSTRACT

A moving window detector for a radar including adding circuits for automatic detection of moving targets wherein the components of prior art devices are substantially reduced by utilizing a digital integration circuit and a shift register with a number of storage locations and wherein the input echo signals are supplied to the input of the shift register and to the integration circuit and the output of the shift register and the integration circuit are supplied to a subtracting circuit which supplies an output to an adder of the integration circuit so as to substantially reduce the number of components over those of the prior art.

12 Claims, 4 Drawing Figures

4,361,840

CIRCUIT ARRANGEMENT FOR A RADAR FOR AUTOMATIC RECOGNITION OF MOVING TARGETS

BACKGROUND OF THE INVENTION

1. Field of the Invention

This invention relates in general to circuit arrangements for a radar recognition of moving targets utilizing a moving window detector in the form of a summing circuit.

2. Description of the Prior Art

The publication M. I. Skolnik "Radar Handbook", McGraw Hill Book Company 1970 at pages 15-18 and the magazine entitled "Wissenschaftliche Berichte" AEG-Telefunken, Volume 42, 1969, part 1, pages 39 to 48 disclose radar circuits with moving window detectors. The Telefunken publication describes the operation of a moving window detector during processing of the information for target recognition by using echo correlation connected with a binary integration circuit. A storage register which consists of a number of storage devices which correspond to the number of echo scans of the radar and which are connected in cascade is necessary as an essential component of the moving window detector thus described. The digital echo signals are passed through all of the storage devices in serial fashion and the information is removed from the last of the series of storage means as each new value is received in the first storage means. Simultaneously, all of the items of information which are contained in the moving window detector are added up in parallel fashion and this prior art process requires storage means wherein the amount of each individual storage element has to be accessible and furthermore requires an extensive adding array for combining all of the outputs of the various storage means. Such components are not available in large multi-stage modules. For a number of, for example, eight echo scans there must be seven individual storage means which are arranged in cascade. The combination of all storage outputs and the input signal must be combined with seven different adding circuits. Such an arrangement is illustrated in FIG. 1 of the application.

SUMMARY OF THE INVENTION

The invention substantially reduces the amount of modules required over those of the prior art. Particularly, with higher number of echo scans being processed, the modules in the prior art device become very large in number and the present invention utilizes a simple integration during the target recognition. In the invention, the summation of m echo signals which succeed one another at the input of a digital integration circuit is limited to a given number n by means of a shift register (delay register) which has the given number of n storage locations and is actuated in parallel to the integration circuit and whose only output is connected to the integration circuit through a subtractor.

An individual storage means can be used in place of the usually conventional chain of storage means as a result of the circuit arrangement of the invention if it is assured that only the same number of items of information as the given echo scans are added. For this purpose, all information is delayed in the delay register parallel to the adding up process in the individual storage means for a particular number of echo scans and the output of the shift register is subtracted from the contents of the integrator circuit. Hence, it follows that only one storage means and one adder are required for the integrator and only one storage module having only one output for the delay register is required.

According to an advantageous embodiment of the invention, the digital echo signals which are delayed in the shift register and the echo signals which are supplied from the storage output of the integration circuit are supplied as separate inputs to a subtractor which has its output connected to the second input of the adder of the integration circuit. Another advantageous embodiment consists in that the echo signals which are delayed in the shift register are subtracted from the undelayed input echo signals and the difference signal is fed to the adder of the integration circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
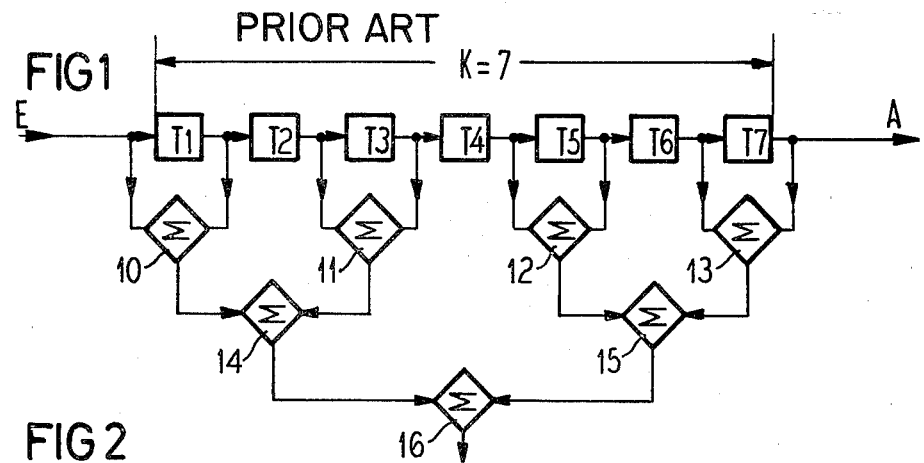
FIG. 1 illustrates a moving window detector according to the prior art.

FIG. 1 illustrates a moving window detector of the prior art wherein input echo signals of a radar system are supplied to a first storage means T1 which supplies an output to a second storage means T2 which in turn supplies an output to a third storage means T3 and so on through a storage means T7 assuming that there are eight echo scans that must be processed for detection of the moving target. In other words, there is one less storage means than the number of required echo scans which are assumed to be eight in the example of FIG. 1. A plurality of adding means are connected to the storage means as shown with the adders 10, 11, 12 and 13 respectively connected to the inputs of storage means T1, T2, T3, T4, T5, T6 and the input to T7 and the output of T7.

Two additional summing means are connected to the summing means 10 through 13 with the summing means 14 receiving the outputs of the summers 10 and 11 and the summing circuit 15 receiving the outputs of the circuits 12 and 13. A summer 16 receives the outputs of the summers 14 and 15.

Figure 2:
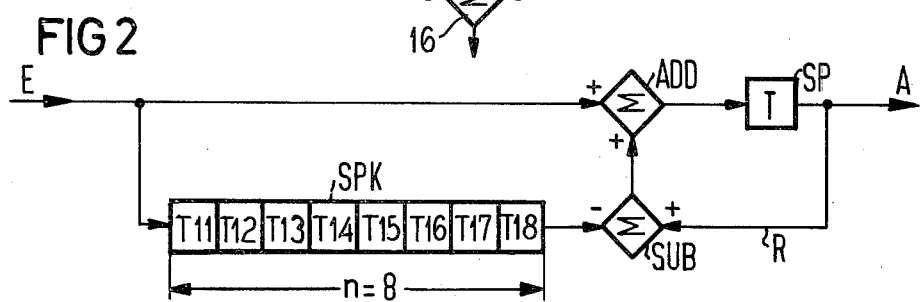
FIG. 2 illustrates a moving window detector according to the invention.

FIG. 2 illustrates the exemplary embodiment of the invention and comprises a moving window integrator having a circulating storage means. The input echo signals are received at input terminal E and are supplied to an integration circuit comprising an adder ADD which supplies its output to an individual storage means SP which supplies an output to an output terminal A. A shift register SPK comprises a plurality of storage means in cascade comprising the storage means T11, T12, T13, T14, T15, T16, T17 and T18 and the input of the storage register is connected to the input terminal E and the output is connected to a subtractor SUB which supplies an output to the adder circuit ADD and receives a feedback signal R from the output of the individual storage means SP.

It is necessary for correct operation of the moving window integrator that at the beginning of transfer of information that the individual storage means SP and the shift register SPK have no storage information contained therein. The number of the radar periods required to detect the target, in other words, the number of echo scans required to be scanned with the antenna pattern determines the number of storage elements in the shift register SPK. The digital signal which is present at the input E is fed both to the individual storage means SP through the adder ADD and to the first storage location of the shift register SPK. Each additional signal causes a counting process in the integrator with the aid of the feedback path R where as the signals in the shift register are fed to the subtractor from its only output from a storage means T18 with a delay depending upon the number of storage units of the shift register. The output of the shift register is subtracted from the output of the individual shift register SP and the subtractor SUB to form a difference which is then supplied to the adder ADD and added with the incoming signal before being supplied to the individual storage means SP.

A substantial savings can be achieved by means of the circuit of the invention compared to the circuit illustrated in FIG. 1 of the prior art as can be seen by using a specific numerical example for a moving window integrator.

Let the following values be assumed:
Number of range gates: 200
Number of echo scans: 51
Word length: 12 bits (a) A conventional moving window integrator requires storage means (4×256 bits) requires 3×50=150. Adders or summing circuits (4 bit parallel) requires 3×50=150.

Thus the number of modules (16 pin dual-in-line) equal 300 modules.

The moving window integrator according to the invention requires the following components.

Individual storage means for integrator (SP) (4×256 bits) requires 3×1=3.

The number of storage means in the shift register SPK (12×200×51 bits=122,400 bits) requires 2×1=2.

The number of adders and subtractors (4 bit parallel) required is 3×2=6 or a total of 11 modules are required in the moving window integrator according to the invention wherein 300 modules are required in the prior art unit and, thus, a reduction of almost 30:1 in the number of modules has been obtained.

A commercially available module having 65,536 storage in a 16 pin-dual-in-line housing is suitable for constructing the storage cascade shift register SPK and only two of these units would be required for the example given above.

Figure 3:
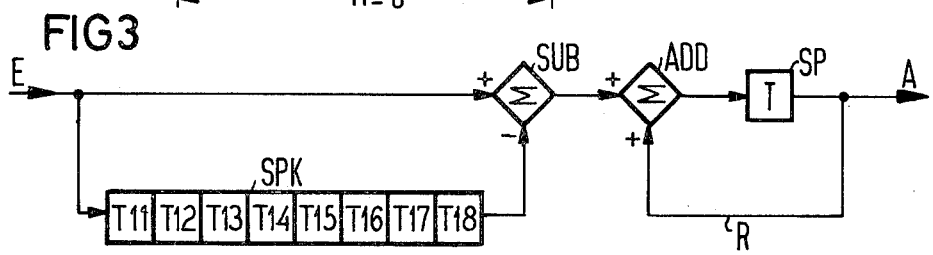
FIG. 3 comprises a modification of the invention.

FIG. 3 illustrates a modification of the invention and the input signal is supplied to the shift register SPK and also to a subtractor SUB which receives a second input from the output of the shift register and the output of the subtractor is supplied to the adder ADD of the integration circuit. The adder supplies the output of the individual storage means SP and a feedback path R is supplied from the output of the individual shift register SP to the input of the adder ADD.

Figure 4:
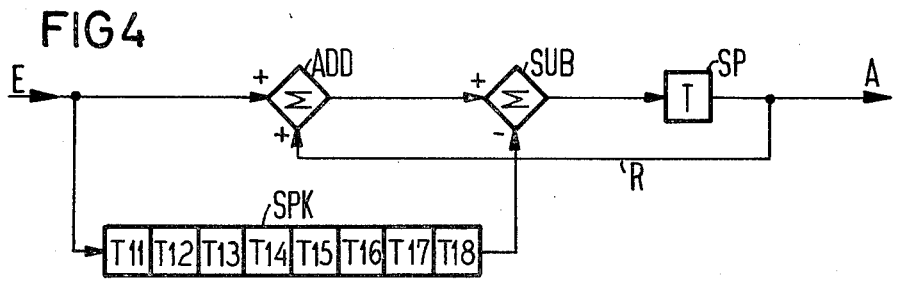
FIG. 4 illustrates a further modification of the invention.

FIG. 4 illustrates a further modification where the input signal is supplied to the input of the shift register and also to an adder circuit ADD. The output of the adder is supplied to a subtractor SUB which also receives the output of the shift register SPK and supplies an input to the individual storage means SP. The feedback path R is from the output of the individual shift register SP to the input of the adder ADD.

The moving window integrator according to the invention can also be used for stabilizing the occurrence of false alarms. For this purpose, two integration circuits are necessary and rectification is done once before and once after the integration. Subsequently, comparison of the two outputs is accomplished through a threshold circuit.

It is seen that this invention substantially reduces the number of modules required in a moving window detector for a radar and although it has been described with respect to preferred embodiments, it is not to be so limited as changes and modifications may be made therein which are within the full intended scope as defined by the appended claims. 9n

I claim:

1. A moving window detector for radar comprising, an input terminal to which echo scan signals are supplied, an adder means connected to said input terminal, an individual storage means connected to said adder means, a shift register having a number of storage cells with its input connected to said input terminal, a subtractor which receives the outputs of said shift register and said individual storage means, and supplies an output to said adder means, and an output terminal connected to the output of said individual storage means.

2. A moving window detector for radar comprising, an input terminal to which echo scan signals are supplied, a subtractor means connected to said input terminal, an adder means connected to the output of said subtractor means, an individual storage means connected to said adder means and supplying a feedback signal from its output to said adder means, a shift register having a number of cells connected between said input terminal and said subtractor circuit and an output terminal connected to the output of said individual storage means.

3. A moving window detector for radar comprising an input terminal to which echo scan signals are supplied, an adder means connected to said input terminal, a subtractor means connected to the output of said adder means, an individual storage means connected to the output of said subtractor means and supplying an output to said adder means, a shift register with a number of storage cells connected to said input terminal and supplying an output to said subtracting means, and an output terminal connected to the output of said individual storage means.

4. A circuit arrangement for automatic recognition of moving targets employing a moving window detector in the form of a summing circuit, comprising an adder (ADD), an individual storage means (SP) connected to the output of said adder, an output terminal connected to said individual storage means, for the summation of m echo signals which succeed one another at the input of said adder (ADD) limited to a given number n by means including a delay shift register (SPK) which receives the input signal from an input terminal and has a given number n of storage locations, and a subtractor receives the outputs of said shift register and said individual storage means and supplying an input to said adder.

5. A circuit arrangement as claimed in claim 4, characterized in that the storage means (SP) and the shift register (SPK) contain no stored values when the circuit arrangement is initially actuated.

6. A moving window detector according to claim 4 characterized in that two circuit arrangements whose outputs are compared via a threshold, are employed for the purpose of maintaining constant the false alarm-rate (CFAR).

7. A circuit arrangement for automatic recognition of moving targets employing a moving window detector in the form of a summing circuit, comprising an adder (ADD), an individual storage means connected to the output of said adder and supplying an input to said adder, for the summation of m echo signals which succeed one another at the input of said adder (ADD) limited to a given number n by means including a delay shift register (SPK) which receives the input signal from an input terminal and has a given number n of storage locations, and a subtractor (SUB) connected to said input terminal and receiving the output of said shift register and supplying an input to said adder.

8. A circuit arrangement as claimed in claim 7 characterized in that the storage means (SP) and the shift register (SPK) contain no stored values when the circuit 9. A moving window detector according to claim 7 characterized in that two circuit arrangements whose outputs are compared via a threshold, are employed for the purpose of maintaining constant the false alarm-rate (CFAR).

10. A circuit arrangement for automatic recognition of moving targets employing a moving window detector in the form of a summing circuit, comprising an input terminal, an adder (ADD) connected to said input terminal, a subtractor receiving the output of said adder, an individual storage means (SP) connected to receive the output of said subtractor and supplying an input to said adder, an output terminal connected to the output of said individual storage means, for the summation of m echo signals which succeed one another at the input of said adder (ADD) limited to a given number n by means including a delay shift register (SPK) which receives the input signal from said input terminal and has a given number n of storage locations, and the output of the shift register is connected to said subtractor (SUB).

11. A circuit arrangement as claimed in claim 2 characterized in that the storage means (SP) and the shift register (SPK) contain no stored values when the circuit arrangement is initially actuated.

12. A moving window detector according to claim 10 characterized in that two circuit arrangements whose outputs are compared via a threshold, are employed for the purpose of maintaining constant the false alarm-rate (CFAR).

* * * * *